United States Patent [19]

Greacen

[11] Patent Number: 4,584,166
[45] Date of Patent: Apr. 22, 1986

[54] TOOLING SYSTEM FOR REMOTE LOAD POSITIONING

[75] Inventor: John S. Greacen, Avon, Conn.

[73] Assignee: Combustion Engineering, Inc., Windsor, Conn.

[21] Appl. No.: 480,168

[22] Filed: Mar. 29, 1983

[51] Int. Cl.⁴ ............................................ G21C 19/20
[52] U.S. Cl. ..................................... 376/260; 254/387; 212/228
[58] Field of Search .............. 376/260, 203, 204, 463; 254/387, 279; 212/228, 225, 205; 165/76

[56] References Cited

U.S. PATENT DOCUMENTS

| | | | |
|---|---|---|---|
| 896,406 | 8/1908 | Maxfield et al. | 212/228 |
| 2,743,224 | 4/1956 | Ohlinger | 376/260 X |
| 2,877,905 | 3/1959 | Wiley | 212/225 |
| 3,891,094 | 1/1975 | Angus | 212/205 |
| 3,973,679 | 8/1976 | Hass et al. | 212/205 |
| 4,002,243 | 1/1977 | Kramer | 212/225 |
| 4,069,921 | 1/1978 | Raugulis et al. | 212/205 X |
| 4,174,999 | 11/1979 | Burns | 376/260 X |
| 4,199,857 | 4/1980 | Meuschke et al. | 376/260 X |
| 4,470,946 | 9/1984 | Vassalotti et al. | 376/204 |
| 4,473,160 | 9/1984 | Neuenschwander | 212/225 X |

Primary Examiner—Deborah L. Kyle
Assistant Examiner—Dan Wasil
Attorney, Agent, or Firm—L. James Ristas

[57] ABSTRACT

A manually controlled tooling system for the remote placement and removal of a load, such as a plug, (12) at a location (6) inaccessible to maintenance personnel. The tooling provides for both horizontal and vertical movement of the load, and, in the preferred embodiment, rotational restraint. The load is supported vertically by at least one line (21) wrapped on a small diameter drum (19) which is supported from a travelling trolley (11) fitted to a sloping track (10). On the same shaft as the load drum, a large diameter centrally located sheave or control drum (20) accepts a single control line (13) counterwrapped in direction with respect to the load support line and terminating at its other end on a hand operated winch mechanism (14). The tooling acts to first allow the trolley to descend the track without relative motion between trolley and load. Then, with the trolley bottomed against a mechanical stop (26), the load is allowed to descend vertically to its desired position. Retrieval of the load is accomplished by reversal of the above steps resulting when the hand winch is reversed. Thus, two load motions in each direction are controlled by a single line without the need for separate, independent motion inputs.

There is further disclosed a collapsable track and trolley system, as well as a method of assembly and operation, that is capable of passage through a narrow manway (7) for deployment in an elongated passageway or conduit (1).

10 Claims, 8 Drawing Figures

TOOLING SYSTEM FOR REMOTE LOAD POSITIONING

BACKGROUND OF THE INVENTION

This invention relates to remote load positioning, and more particularly to remote placement of a plug or similar article on a target within a manually inaccesible area of a nuclear power plant, such as primary system piping.

In many pressurized water reactor piping designs, provision is made for auxiliary shutdown cooling loops to remove residual heat from the primary coolant once the reactor has been shutdown, depressurized, and the primary circulating pumps deactivated. Typically, such loops will draw coolant from a hot leg connecting a steam generator to the reactor vessel, pass the coolant through a heat exchanger, and return the lower temperature coolant to the reactor by means of one of the primary system cold legs. These loops are not used during normal reactor operation and are typically isolated from the system by valves. Past practice has allowed for pipe maintenance on shutdown cooling loops and their isolation valves by providing valves on the reactor hot and cold legs, and thus the shutdown coolant loops; or by physically locating shutdown coolant loop isolation valves above the level of reactor coolant needed for shutdown cooling, thus permitting valve maintenance or replacement without the loss of coolant necessary to maintain the reactor core at specified shutdown temperatures.

For piping systems with none of the above provisions, a means is needed for isolating each of the shutdown coolant loops independently of other loops which provide the cooling function while the defective loop is repaired. One solution is to remove the reactor vessel head and the upper vessel internals, and to remove all the fuel assemblies comprising the reactor core to temporary fuel storage. In this case, the shutdown coolant loops are not needed and the loops may be drained of coolant to permit the necessary maintenance. This method is unacceptable to most reactor operators because of the time and cost to remove and replace the entire core which adds to the reactor's unavailability to produce useful energy.

A second solution is to remove the reactor vessel head and the upper vessel internals. This condition allows access to the reactor vessel hot leg nozzles while the fuel assemblies are still in place in the reactor core. Remote tooling may then be utilized to sequentially plug each of the hot leg nozzles associated with shutdown coolant loops requiring maintenance. Such an operation would require the reactor plant to be placed in the refueling mode with the refueling pool flooded even if a refueling outage were not scheduled.

A third solution is to install a plug in the branching nozzle of the hot leg which is used to draw coolant into the shutdown coolant loop. In this case, the reactor needs only to be placed in the shutdown mode, and the vessel head and internals may remain in place. The plug and tooling are entered into the drained steam generator primary head, assembled, and the plug installed in the branching nozzle by an operator manipulating the tooling described in this disclosure.

SUMMARY OF THE INVENTION

The present invention is directed to manually controlled tooling for the remote placement and removal of a load, such as a plug, at a location inaccessible to maintenance personnel. The tooling provides for both horizontal and vertical movement of the load, and, in the preferred embodiment, rotational restraint. The load is supported vertically by at least one line wrapped on a small diameter drum which is supported from a travelling trolley fitted to a sloping track. On the same shaft as the load drum, a large diameter centrally located sheave accepts a single control line counterwrapped in direction with respect to the load support line and terminating at its other end on a hand operated winch mechanism. The tooling acts to first allow the trolley to descend the track without relative motion between trolley and load. Then, with the trolley bottomed against a mechanical stop, the load is allowed to descend vertically to its desired position. Retrieval of the load is accomplished by reversal of the above steps resulting when the hand winch is reversed. Thus, two load motions in each direction are controlled by a single line without the need for separate, independent motion inputs.

In the preferred embodiment, the invention is a device for transporting a load up or down an incline while maintaining that load in a vertical, plumb attitude with minimum rotation. The load is vertically translated relative to the trolley at a predetermined point along its travel on the incline. The translated and vertical motion are both controlled by a single control line.

The invention further provides a collapsible track and trolley system, as well as a method of assembly and operation, that is capable of passage through a narrow manway for deployment in an elongated passageway or conduit.

For a better understanding of the invention, its operating characteristics, and the specific benefits obtained by its use, reference should be made to the accompanying drawings and description which relate to a preferred embodiment as applied to the plugging of a branching nozzle in the piping constituting a part of the primary coolant loop between a nuclear reactor vessel and its associated steam generator.

DESCRIPTION OF THE PREFERRED EMBODIMENT

Figure 1:
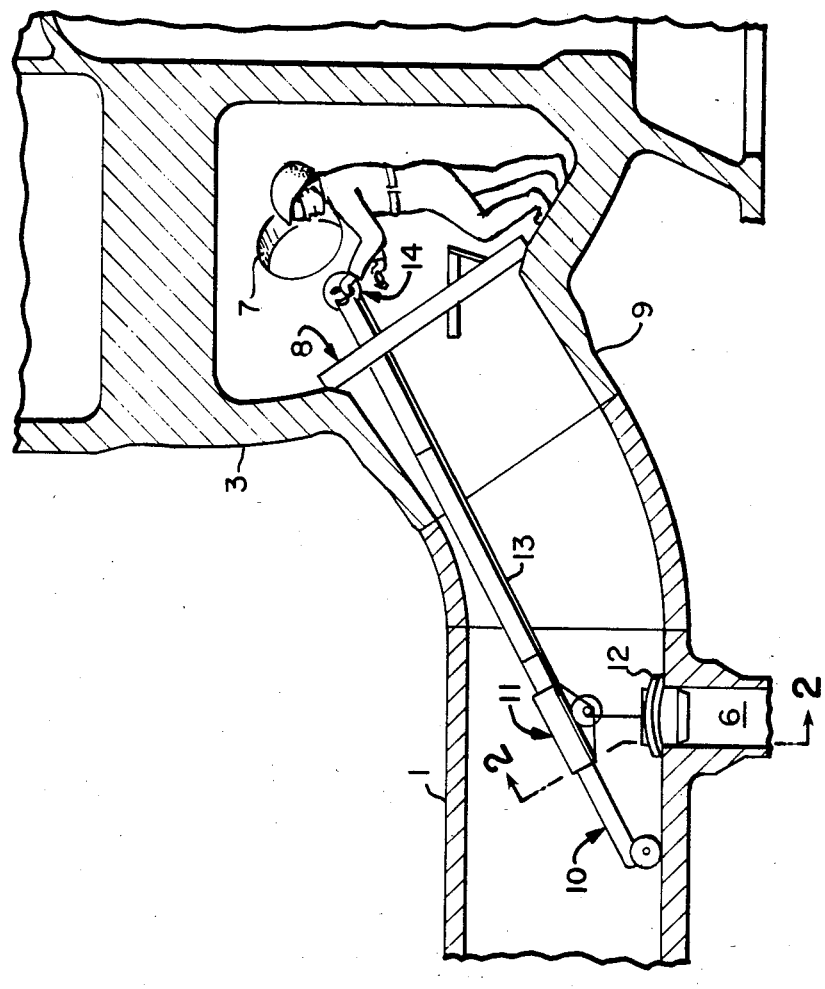
FIG. 1 is a schematic, sectional view of a typical nuclear reactor coolant hot leg piping and a steam generator with the inventive tooling in place, for lowering a pipe plug to the desired position.

FIG. 1 depicts a typical reactor primary coolant hot leg 1 connecting a reactor vessel 2 and the inlet plenum 3 of a steam generator. In the shutdown condition, the primary reactor coolant is drained to a level 4 such that the reactor core 5 remains submerged and which provides a suction head for the shutdown cooling loop inlet nozzle 6. Under these conditions, the steam generator manway 7 may be removed for personnel and equipment access, and the defective shutdown coolant loop deactivated so that there is no flow through nozzle 6. Reactor cooling is provided through one or more of the other hot legs and associated shutdown cooling loops (not shown).

The tooling consists of a support frame 8 which is secured to the steam generator nozzle 9 and a segmented track 10 which is assembled inside the steam generator and hung on support frame 8. An underhung trolley 11 is installed onto track 10 and a flanged nozzle plug 12 attached to the trolley 11 so as to hang in the vertical attitude. The vertical movement of plug 12 and travel of trolley 11 along track 10 are controlled by line 13 connecting trolley 11 to hand winch 14 mounted at the top of the track.

Figure 2:
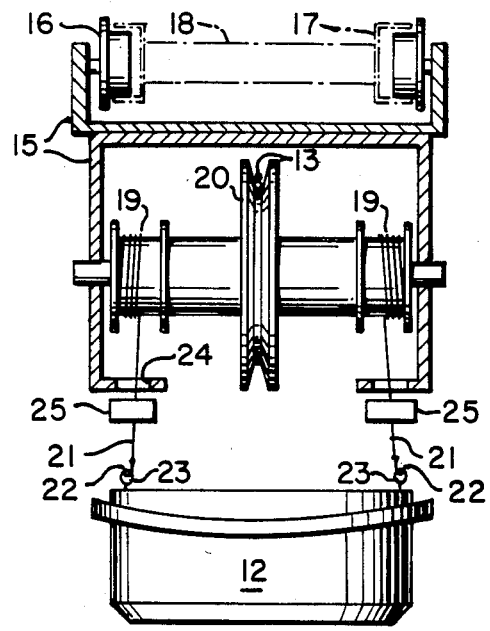
FIG. 2 is a composite section view of the trolley, taken along line 2—2 of FIG. 1.

An end view cross section of the trolley 11 is shown in FIG. 2. It is composed of trolley frame 15 to which are cantilever mounted four roller means such as flanged trolley wheels 16 equipped with anti-friction bearings. These wheels engage track 10, which is constructed of a plurality of sections or segments, each preferably comprising two parallel channel-shaped members 17 connected by a series of structural members 18. Track members 17,18 in this figure are shown in phantom. Mounted in trolley frame 15 is a freely rotating double drum assembly consisting of two small diameter flanged drums 19 for load support and one larger diameter control drum or sheave 20 all fixed so that they turn as a unit.

One end of two equal length load support lines 21 is fixed to a respective drum 19 by wrapping one line righthand and the other lefthand as shown. At the opposite end of support lines 21 are affixed safety snap hooks 22. Each hook engages a fitting 23 mounted on the plug 12. One fitting is adjustable so that the load hangs true and level if small differences in the length of support lines 21 exist. The use of two support lines dampens the tendency of load 12 to rotate about the vertical axis. A separate control line 13 is affixed to sheave 20 and is wrapped in a counterclockwise direction with respect to support lines 21. The number of wraps of control line 13 is equal to or greater than the number of revolutions of drums 19 to move the load 12 between its full up and full down positions, when the load is positioned over the target as shown in FIG. 1. Slideably adjustable line stops 25 bear on trolley frame 15 to establish the up limit position when control line 13 is pulled in the load raise mode. Support lines 21 pass through elongated slots 24 in the trolley frame 15 and are so proportioned to prevent passage of line stops 25.

Figure 3:
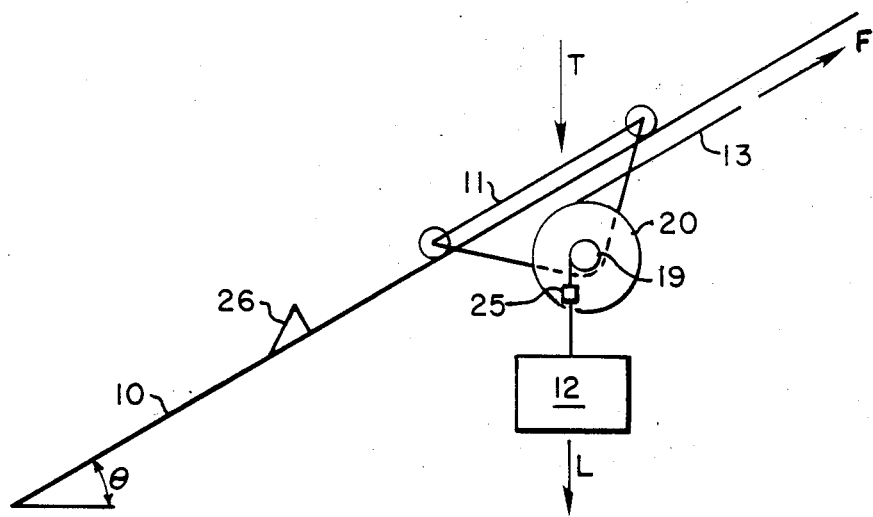
FIG. 3 is a schematic force diagram representing the moving components of the invention.

For better understanding of the forces involved and the motions of trolley and load, reference is made to FIG. 3. Shown in schematic form is an inclined track 10 upon which rolls a trolley 11 of weight T. Load 12 has a weight designated as L and is supported by lines wrapped counterclockwise around small drums 19 of diameter, $D_1$. Control line 13 is wrapped in a clockwise direction around large sheave 20 of diameter $D_2$. Tensile force in line 13 is designated as F. Forces T, L, and F are the only forces acting on the system, with the exception of system friction, which for descriptive purposes may be assumed as negligible.

Force F is composed of a torque component, $F_1$, necessary to wind up load 12 until line stops 25 restrict its upward motion; and a travel component, $F_2$, which must be added to cause trolley and load to move up the incline. The total tensile load in the control line is $F = F_1 + F_2 = (T+L) \sin \theta$; the torque component is $F_1 = D_1/D_2 (L)$. Thus the condition which must be satisfied is given by:

$$\frac{D_1}{D_2} < \frac{(T+L)\sin\theta}{L}$$

As control line 13 is winched up, trolley and load ascend the track 10. As it is paid out, trolley and load descend until the trolley bottoms on track stop 26. In this condition, the force in control line 13 necessary to prevent pay out of load 12 with respect to trolley 11 is equal to the torque component, $F_1$. A reduction in tension in line 13 causes rotation of drums 19 and 20 and the vertical descent of load 12.

As shown in FIGS. 1 and 3, once the load is at rest in its target location, tension in control line 13 is reduced to zero and the holding force at hand winch 14 disappears. Further rotation of the hand winch is prevented by a locking device (not shown) on the winch shaft. Plug and tooling may now be left in place with the tooling supported by a frame 8. The shutdown coolant loop may now be drained and the required maintenance performed.

Load retrieval is essentially the reverse of load placement. Upon winching in of control line 13, an initial tension equal to $F_1$, will cause the load to rise in the vertical until stops 25 restrict further motion. At this point, additional tension equal to $F_2$ is applied via hand winch 14 and load and trolley caused to disengage from track stop 26 and ascend the track.

Figure 4:
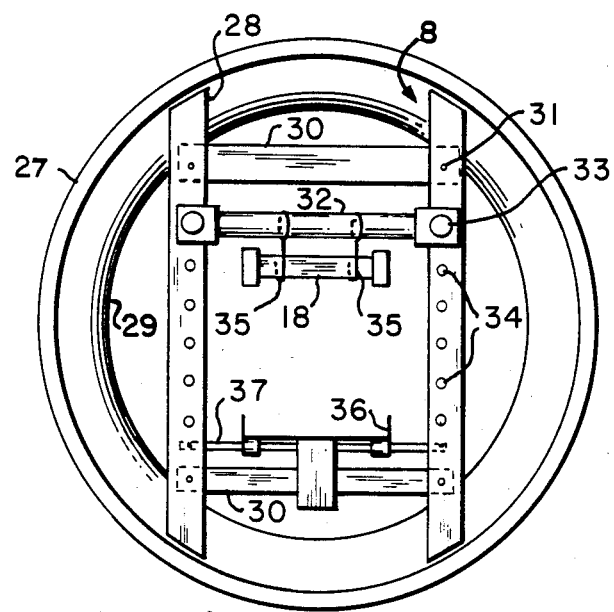
FIG. 4 is a schematic view of the support frame of the invention as viewed by the operator illustrated in FIG. 1.

FIG. 4 illustrates the support frame 8 installed within nozzle ring 27 which is a permanent part of steam generator nozzle 9 (See FIG. 1). The frame consists of two beams 28 which transversely span the inside diameter of the nozzle opening 29. Beams 28 are constructed of channel shaped structural members facing each other and accepting two cross members 30 which are permanently pin connected to the beams by hinge pins 31. Thus, the beams and cross members form a collapsible hinged parallelogram which can pass through a manway and which, when installed, is held in place by the surrounding nozzle ring 27. A support bar 32 is captured by beam channels 28 and is slideably adjustable up or down, being held in place by threaded hand screws 33 which engage a plurality of locating holes 34 in each beam. Attached to support bar 32 are two support hooks 35 which engage cross members 18 of the track assembly. Thus the assembly of the track sections is facilitated and the assembled track can be located at a convenient elevation for operation of the remaining tooling. To the frame is also attached a removable load tray 36 which is supported by hinged bar 37 and by the lower cross member 30. The tray provides a convenient shelf for supporting the load for its attachment 22 to the trolley. (See FIG. 2).

Figure 5:
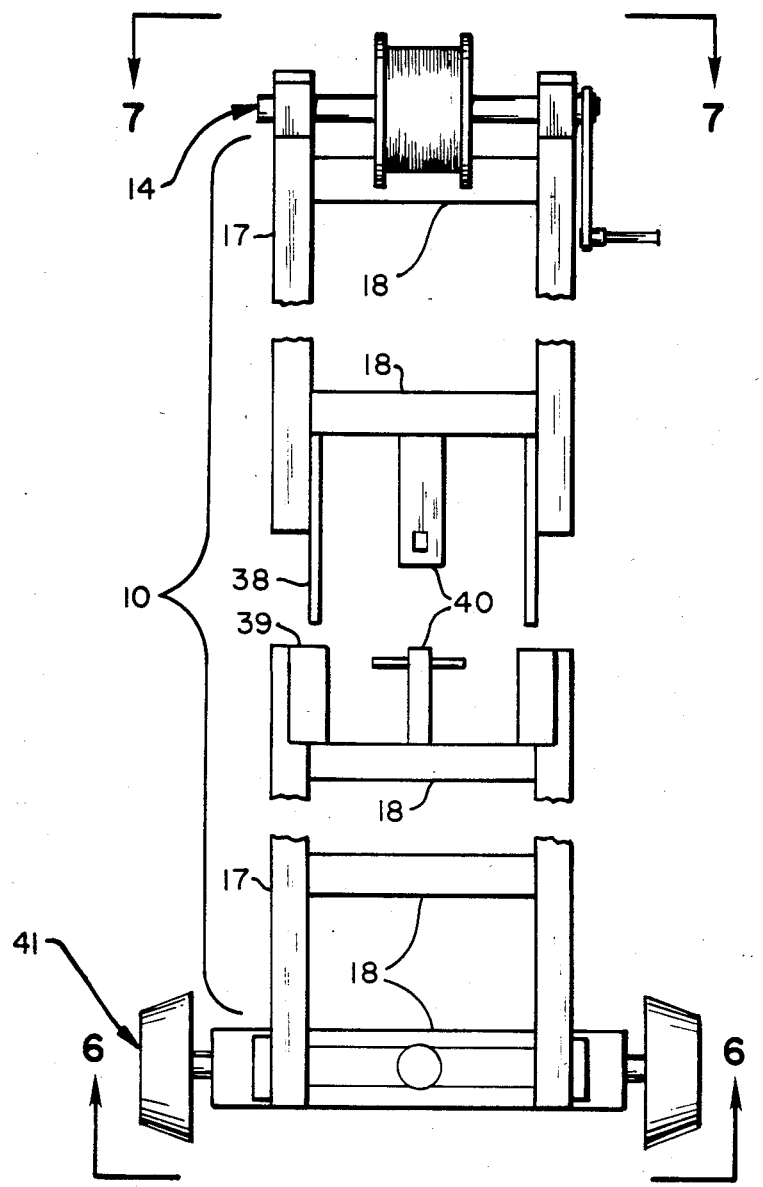
FIG. 5 is a schematic view of the track segments of the tooling system.

FIG. 5 depicts the segmented track 10 (see FIG. 1). It consists of a plurality of track segments, the basic structural members of each being two channel shaped tracks 17 spaced apart and held by a series of cross members 18. Segments are joined together by a pair of tongue plates 38 which engage deep, narrow slots 39 in the mating segment. Segments are prevented from separating by hand operated latching means 40.

Figure 6:
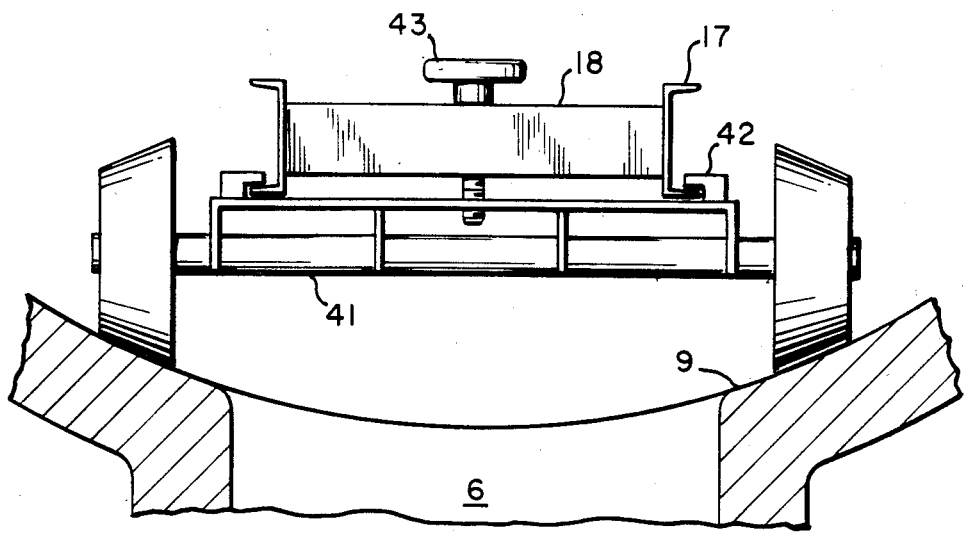
FIG. 6 is a schematic view of the wheel assembly portion of the tooling system, as viewed from the direction line 6 in FIG. 5.

FIG. 6 is an end view of the bottom of the track section to which is assembled a wheel assembly 41. This is a separate assembly to allow entry through manway 7. It is arranged to span shutdown inlet nozzle 6 during installation and removal of track section 10. Wheels are freely turning on their axle and are beveled to mate with the curvature of the inside of the pipe. Assembly 41 is keyed to tracks 17 by retainers 42 and held in position by a hand screw 43 captured in cross member 18.

Figure 7:
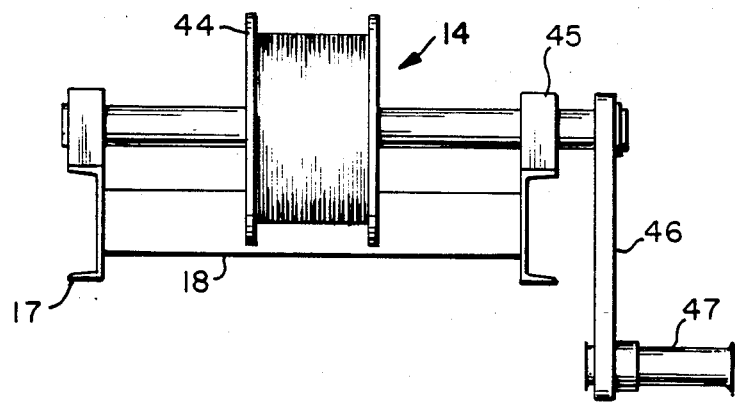
FIG. 7 is a schematic view of the winch portion of the tooling system.

FIG. 7 is an end view of the top of the track section to which is permanently mounted winch drum 44 supported in bearings 45. Referring also to FIG. 1, control line 13 is threaded and anchored to this drum for equipment operation. Crank arm 46 and handle 47 control payout and payin as well as tension in the control line. By suitable positioning of crank arm and handle, trolley 11 shown in FIG. 1 may be assembled onto tracks 17. Handle 47 is allowed to slide within arm 46 to allow passage of the assembly through the manway 7.

Figure 8:
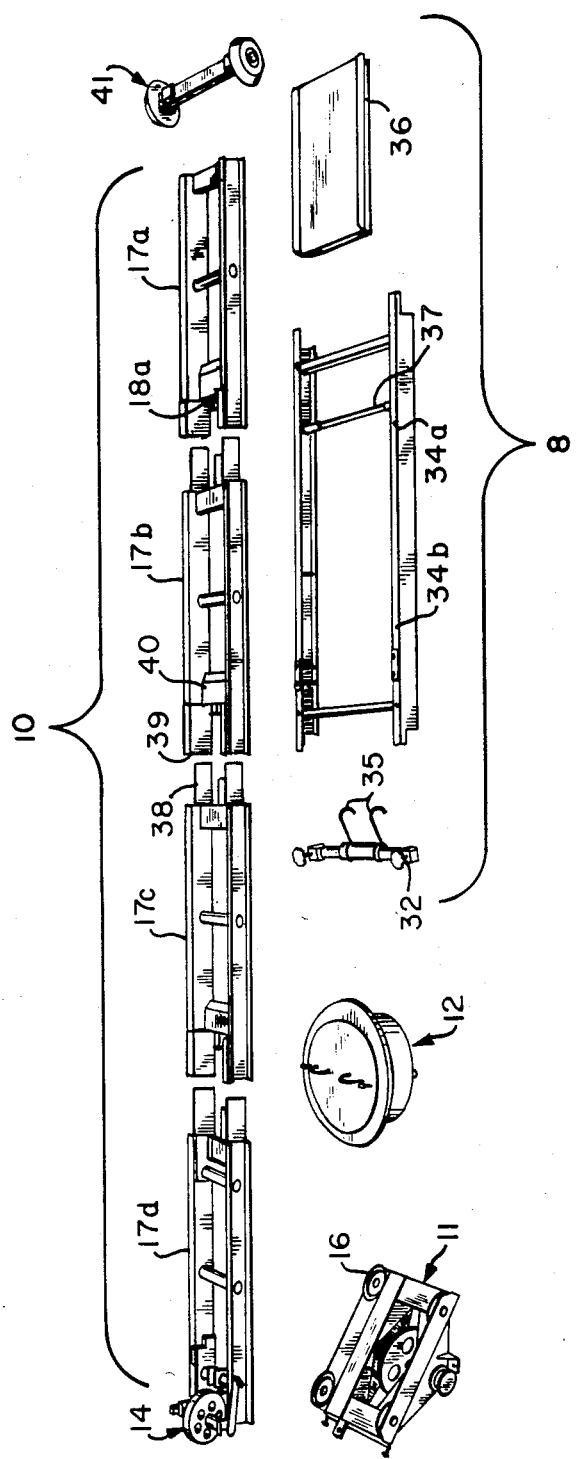
FIG. 8 is a schematic representation of the component parts of the tooling system and load prior to insertion and deployment within the steam generator and piping, shown in FIG. 1.

FIG. 8 represents the component parts of the system and load, prior to insertion and deployment as shown in FIG. 1. Typically, the operator enters the steam generator 3 through manway 7, and an assistant remains outside to pass the components through the manway.

The deployment procedure includes as the first step, passage of the support frame 8 through the manway, in a collapsed parallelogram configuration. The operator "squares up" the frame 8 transverse to the nozzle ring 27 (as shown in FIG. 4), then fastens the support bar 32 to the frame at a lower set of locating holes 34a to give the frame structural rigidity and to provide a support means for the inclined track member 10.

Next, the bottom track segment 17a and wheel assembly 41 are passed through the manway and assembled by the operator in accordance with FIG. 6. The wheels are passed through the frame into rolling contact with the base of the nozzle 9, and the other end of track segment 17a, 18a is placed on hooks 35 on the support bar 32.

Each additional track segment 17b, 17c, 17d is in turn mated with the preceeding segment as shown in FIG. 5, by the tongue plates 38, slots 39 and latch 40. As the track increases in overall length, the support bar 32 is raised to higher locations 34b on the frame 8.

As shown in FIG. 1, when the final track segment 17d is in place, the target location, inlet 6, is between the wheels 41 and the frame 8. A sufficient portion of the segment 17d remains in the steam generator to permit attachment of the trolley 11 and operation of the winch 14. The trolley wheels 16 are passed into channels of the frame 17, as shown in FIG. 2, and the trolley is attached to the winch control line 13 is attached to, and wound onto winch drum 44, FIG. 7. This operation is aided by the manual engagement of a latch pin (not shown) which prevents movement of the trolley with respect to track 17. Preferably, a load tray 36 is attached to bar 37 on the frame 8, for supporting the load, or nozzle plug 12.

The operator then pays out control line 13 until support lines 21, FIG. 2, can be manually attached to plug 12 by snap hooks 22. Plug 12 is then winched up until line stops 25 contact the trolley frame 15, preventing further motion. The trolley, while still under the control of the operator, is then disengaged from track 17 by removal of the latch pin, (not shown). The operator then pays out the control line 13 until the trolley 11 contacts the stop means 26 (see FIG. 3), and the load is lowered into the inlet 6. The stop means 26 are attached to the track 17 before deployment of the system, based on knowledge of the distances and elevations represented in FIG. 1.

After the plug is in place, the operator exits from the steam generator 3, and returns after the maintenance work in the primary piping is completed. The nozzle plug and tooling system are then removed in reverse order.

I claim:

1. A tooling system for transporting a load to a target from a remote position, comprising:

a support frame adapted to be rigidly mounted at the remote position;

an elongated track supported at the upper end by the frame and the other end adapted to extend beyond the target;

a trolley mounted on the track and freely moveable under the influence of gravity on said track section;

a drum assembly carried by said trolley, said drum assembly including a load drum having diameter $D_1$ and a larger control drum having a diameter $D_2$, said load drum and control drum connected to turn as a unit; a load support line wound on the load drum at one end and having means at the other end for connection to the load;

a control line affixed to and wound on the control drum in a direction opposite to said support line winding, the number of wraps of control line being equal to or greater than the number of revolutions of the load drum required to move the load between its final position on the target and the carrying position under the trolley, when the load drum is directly above the target;

winch means operable from the remote position, for selectively drawing the control line toward or paying out the control line from the remote location;

restraint means carried by the track for stopping the trolley directly over the target;

whereby the load is transported up or down the inclined track while remaining in a vertical attitude such that when positioned over the target the load moves vertically with respect to the trolley, the transport and vertical movement being responsive to said single control line.

2. The tooling system of claim 1, further including means for limiting the amount of load support line that can be wound onto the load drum.

3. The tooling system of claim 2 wherein the track makes and acute angle $\theta$ relative to horizontal, the load has weight L and the trolley weight T, and the ratio of drum diameters $D_1/D_2$ is less than the ratio $((T+L)\sin\theta)/L$.

4. The tooling system of claim 3 wherein the drum assembly includes two load drums of equal diameter coaxially mounted with the control drum, said load drums each having a load line, one being wrapped right handed on one load drum and the other load line being wrapped left handed on the other control drum, both of said load lines including means for attaching said load.

5. The tooling system of claim 4 further including a wheel assembly affixed to the lower end of the track for facilitating the remote placement of the track over the target.

6. The tooling system of claim 4 wherein the track comprises a plurality of track segments having mating and latching means thereon, whereby the elongated track may be assembled from the remote position.

7. The tooling system of claim 6 wherein the track lower segment includes wheel means for locating the track over the target, and the track upper segment includes said winch means.

8. The tooling system of claim 4 wherein said support frame comprises two parallel beams pivotally mounted to spaced apart cross members, and a support bar selectively rigidly joining said beams.

9. The tooling system of claim 8 wherein said beams include means for engaging said support bar in a selected one of a plurality of positions between said cross members, whereby said support bar provides means for supporting said track in said frame.

10. In a nuclear power plant having a steam generator including an inlet leg aligned to an inlet nozzle leading into an inlet plenum, a tooling system for transporting a load from the plenum to a predetermined target in the inlet leg, comprising:

a frame supported within the plenum transverse to the nozzle;

an inclined track supported at the upper end by the frame and having the lower end extending beyond the target;

a trolley including roller means mounted on the track for free movement thereon under the influence of gravity;

a unitary double drum assembly carried by said trolley, including a load drum having diameter D1 and a control drum having a larger diameter D2, said load drum having a load line affixed thereto and wrapped thereon and further including means for attaching said load line to the load;

a control line affixed to and wrapped around said control drum in a direction opposite to said load line winding, the number of wraps of control line being equal to or greater than the number of revolutions of the load drum required to move the load between its target location and the carry position when the trolley is located over the target;

winch means operable from the plenum, for drawing the control line toward or paying the control line out away from the frame;

restraint means carried by the track for stopping the trolley directly above the target.

* * * * *